United States Patent [19]

McGinniss

[11] 4,446,246

[45] May 1, 1984

[54] CATALYST SYSTEMS FOR TWO-PACK ACRYLIC ADHESIVE FORMULATIONS

[75] Inventor: Vincent D. McGinniss, Delaware, Ohio

[73] Assignee: Three Bond Co., Ltd., Tokyo, Japan

[21] Appl. No.: 416,270

[22] Filed: Sep. 9, 1982

[51] Int. Cl.$^3$ .......................... C08F 4/30; C08F 4/32
[52] U.S. Cl. ................................ 502/155; 502/152; 502/160; 525/370; 525/384; 525/291; 528/87
[58] Field of Search .............. 252/428, 431 C, 431 N, 252/431 R; 526/192

[56] References Cited

U.S. PATENT DOCUMENTS

| | | | |
|---|---|---|---|
| 3,333,025 | 7/1967 | Bader | 260/880 |
| 3,591,438 | 7/1971 | Toback et al. | 156/310 |
| 3,668,194 | 6/1972 | Shen | 526/192 X |
| 3,725,504 | 4/1973 | Owston | 260/876 R |
| 3,832,274 | 8/1974 | Owston | 161/183 |
| 3,838,093 | 9/1974 | Owston | 260/33.8 U B |
| 3,855,040 | 12/1974 | Malofsky | 156/310 |
| 3,860,568 | 1/1975 | Chabert et al. | 252/428 X |
| 3,890,407 | 6/1975 | Briggs et al. | 260/878 R |
| 3,968,162 | 7/1976 | Lartigau et al. | 252/431 R X |
| 3,985,718 | 10/1976 | Chabert et al. | 526/192 X |
| 3,994,764 | 11/1976 | Wolinski | 156/218 |
| 4,052,244 | 10/1977 | Skoultchi | 156/310 |
| 4,230,834 | 10/1980 | Sirota | 525/308 |

FOREIGN PATENT DOCUMENTS 56-34204  8/1981  Japan .

*Primary Examiner*—Patrick Garvin
*Attorney, Agent, or Firm*—Mueller and Smith

[57] ABSTRACT

Disclosed are novel catalyst systems and method for curing a peroxide-curable ethylenically unsaturated (e.g. acrylic or vinyl) composition wherein the catalyst system is a combination of the peroxide curing agent and a $Cu^{+1}$ activator or a combination of a peroxide curing agent and an activator system comprising a furfuryl alcohol and an acid catalyst. Also disclosed is a new catalyst system for curing ring compounds (e.g. epoxides) which comprises a combination of ferrocene and a diazonium salt of a Lewis acid. Preferred curable compositions are adhesives and especially acrylic adhesives and epoxy adhesives.

8 Claims, No Drawings

CATALYST SYSTEMS FOR TWO-PACK ACRYLIC ADHESIVE FORMULATIONS

BACKGROUND OF THE INVENTION

The present invention relates to two-pack acrylic adhesive formulations and more particularly to novel catalyst systems therefor.

The use of structural adhesives has increased substantially in recent years in the aircraft, housing and construction, automotive and footwear industries, to name but a few large quantity users of such adhesives. The trend to structural adhesive formulations has been facilitated by the replacement of conventional metal and ceramic materials by polymers and by the development of a new generation of adhesives which are tough and can be applied quickly without burdensome surface preparation. Unlike conventional epoxy adhesive formulations which generally cure slowly and required careful mixing and surface preparation techniques, the second generation acrylic adhesives contain catalysts and promoters which promote rapid, room temperature cure and obviate the need for meticulous surface preparation and proportional mixing of components. Moreover, such second generation acrylic adhesive formulations possess excellent strength which is derived through special toughening mechanisms.

A variety of catalyst systems have been developed for reactive acrylic adhesive formulations. For example, prior catalyst systems include the combination of a tertiary amine and a peroxide (U.S. Pat. No. 3,333,025); aldehyde/amine condensation products in combination with certain chelates (U.S. Pat. No. 3,591,438); amines plus benzoyl peroxide (U.S. Pat. Nos. 3,725,504 and 3,832,274); a redox system of cobalt napthanate and MEK hydroperoxide (U.S. Pat. No. 3,838,093); the combination of amines, salts of transition metals, amine-aldehyde condensation products, and peroxides (U.S. Pat. No. 3,890,407); amines and peroxides in combination with oxidizable metal ions (U.S. Pat. No. 3,994,764); saccharin or copper saccharate and para-toluene sulfonic acid (U.S. Pat. No. 4,052,244); and peroxides and amine-aldehyde condensation products with a non-transition metal including lead, zinc, tin, calcium, strontium, barium, and cadmium (U.S. Pat. No. 4,230,834). U.S. Pat. No. 3,855,040 shows a combination of a peroxy initiator, a strong acid, and ferrocene. Relative to the use of transition metals or transition metal salts as accelerators, U.S. Pat. No. 4,230,834 shows that the use of any transition metal ion accelerator, especially copper, causes poor bonding or low tensile strength values when compared to the non-transition metal ion accelerators disclosed therein.

BROAD STATEMENT OF THE INVENTION

Broadly, the present invention is a method for curing a peroxide-curable ethylenically unsaturated (eg. acrylic) composition of the type having at least one ethylenic-functional compound selected from an ethylenic-functional monomer, oligomer, polymer, or mixtures thereof, and a peroxide curing agent. The improvement in such method for activating the peroxide curing agent comprises blending an activator with said acrylic composition to activate said peroxide to rapidly cure the ethylenic-functional compound. The activator is selected from the group consisting of:
(a) $Cu^{+1}$; and
(b) furfuryl alcohol and an acid catalyst.

The curable composition or mixture desirably is a structural acrylic adhesive containing specialized, toughened acrylic compounds and is supplied in two packages. The activators are combined with the peroxide just prior to application as rapid initial set up of the acrylic composition follows such blending.

The $Cu^{+1}$ activator can be dispersed in one of the adhesive packages neat or can be complexed with any compound containing a hydroxyl group or a non-aromatic unsaturated group. The substrate bearing the $Cu^{+1}$ can be one of the reactive (eg. acrylic) components in the curable composition, a thermoplastic additive, or any other component contained therein. A variety of novel complexes in acrylic adhesive technology results thereby.

The reaction of a furfuryl alcohol or furfuryl alcohol resin with a cationic or acid catalyst results in the generation of heat adequate to result in the generation of free radicals from a peroxide initiator for the curing of ethylenic, eg. acrylic and vinyl, reactive components. Note also that a furan resin would result also.

A novel adhesion promoter for acrylic adhesive formulations comprises:

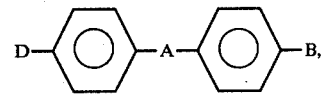

where
D is an organic group containing curable ethylenic unsaturation;

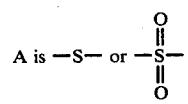

B is an organic group containing no curable ethylenic unsaturation (eg. an epoxide group).

The novel adhesion promoter can be complexed with the $Cu^{+1}$ activator and provides improved adhesion, boiling water resistance, and solvent resistance.

A further invention is a catalyst system for effecting ring-opening cure (eg. epoxides) wherein the catalyst system comprises ferrocene and an aryl diazonium salt of a Lewis acid. This novel catalyst system also will effect the furfuryl alcohol cure described above.

Advantages of the present invention include the development of novel catalyst systems and methods for rapidly curing peroxide-curable formulations such as acrylic adhesive formulations without application of heat. Another advantage is that the catalyst systems do not detract from bond strength or other adhesive properties, but can enhance the performance and properties of the cured acrylic composition. Another advantage is the impressment of additional curing mechanisms into the system for providing truly unique, specialty acrylic adhesive formulations. These and other advantages will be readily apparent to those skilled in the art based upon the disclosure contained herein.

DETAILED DESCRIPTION OF THE INVENTION

In its broadest aspects, the present invention provides novel activators which activate a peroxide catalyst or initiator for achieving the cure of an acrylic, vinyl, or like ethylenically unsaturated composition capable of being cured by a peroxide initiator. For ease of description only, the peroxide-curable ethylenically unsaturated component often will be described as an acrylic (or vinyl) compound as acrylic adhesives are a preferred embodiment of the present invention. No limitation on the invention should be inferred. Referring now to the use of a $Cu^{+1}$ activator, the $Cu^{+1}$ activator functions as a reducing agent for activating a peroxide initiator because the $Cu^{+1}$ activator loses an electron according to the following reaction mechanism:

$$Cu^{+1} \rightarrow Cu^{+2} + 1e^{-}$$

RO-OR (peroxide) + $1e^{-} \rightarrow RO^{-}$ + RO. (oxidizing agent)

The foregoing reaction system should be contrasted to the prior use of $Cu^{+2}$ (U.S. Pat. No. 4,052,244) in which the $Cu^{+2}$ gains an electron making the $Cu^{+2}$ an oxidizing catalyst. In this regard see the following text, Hogness and Johnson, "Qualitative Analysis and Chemical Equilibrium", Henry Holt & Company, New York, N.Y., p. 89 (1954), the disclosure of which is expressly incorporated herein by reference. Several important observations can be made relative to the functioning of the $Cu^{+1}$ activator as a reducing agent for activating a peroxide initiator. Initially, the loss of an electron by $Cu^{+1}$ occurs at room temperature as does the reaction of the generated electron with the peroxide initiator. The spontaneous room temperature reaction sequence, then, concludes with the peroxide initiator initiating the free radical cure of the acrylic or vinyl resin in the composition. This room temperature reaction is very rapid with set times for acrylic adhesives as short as about 1–4 minutes being common. Since this spontaneous reaction is rapid at room temperature, the $Cu^{+1}$ activator and peroxide initiator necessarily must be separated prior to cure. A two-pack formulation is appropriate. Another very important observation is that, contrary to U.S. Pat. No. 4,230,834 which shows that a $Cu^{+2}$ catalyst is detrimental to adhesive performance, the examples of the present invention clearly show that the $Cu^{+1}$ activator positively contributes to improved performance of an acrylic adhesive formulation. Accordingly, the $Cu^{+1}$ activator serves a unique dual function in providing room temperature cure while improving performance of the resulting cured composition.

While the $Cu^{+1}$ activator can function effectively at room temperature, it can be quite advantageous on occasion to combine the $Cu^{+1}$ activator with a reducing agent for making a highly effective redox activator composition. Note that the use of $Cu^{+2}$ in combination with a reducing agent for generation of a $Cu^{+1}$ activator is encompassed within the precepts of the present invention. The preferred reducing agent is ascorbic acid due to its rapid and effective interaction for ensuring a $Cu^{+1}$ activator and its relative innocuousness with the remainder of the curable composition and with substrates (eg. metals) to which the composition is applied. The presence of the reducing agent further ensures the $Cu^{+1}$ form of copper being present. Other suitable reducing agents for generation $Cu^{+1}$ (cuprous) ions from $Cu^{+2}$ (cupric) ions, include, for example, sodium sulfite, sodium bisulfite, sodium metabisulfate, and the like reducing agents. Further information on this can be found in *Organic Synthesis,* Collective Vol. 1, p. 170 or Vol. 2, p. 131, John Wiley & Sons, New York, N.Y.

(1961), the disclosure of which is expressly incorporated herein by reference.

The $Cu^{+1}$ activator can be supplied neat as a powder, as a halide salt, or an organic soluble compound such as copper (I) triflate, $CuOSO_2CF_3$, [J. Am. Chem. Soc. 95, 1889 (1973)]. Another method for incorporating the $Cu^{+1}$ activator into a composition is to form a $Cu^{+1}$ olefin complex or a $Cu^{+1}$ hydroxyl complex. Further information on these complexes can be found in the following references: Cotton and Wilkinson, "Advanced Inorganic Chemistry", 3d Ed. Chapter 23, John Wiley & Sons, New York, N.Y. (1972); "Inorganic and Organometallic Photochemistry", M. S. Wrighton, Editor, *ACS-Advances in Chemistry Series* 168 (1978); and Srinivasan, *J. Am. Chem. Soc.,* 85, 3048 (1963), the disclosures of which are expressly incorporated herein by reference. The substrates or carriers with which the $Cu^{+1}$ complexes can be a monomer, oligomer, or polymer including acrylic and vinyl reactive compounds, thermoplastic additives, plasticizers, or any other component included within the composition. Many novel $Cu^{+1}$ complexes, thus, can be made, especially in the reactive adhesive area. For reactive acrylic adhesive formulations, the following components are ideally adapted for use in adhesive formulations and form complexes with the $Cu^{+1}$ accelerator:

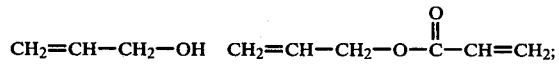

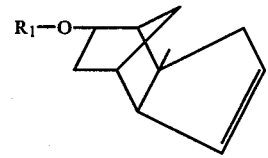

where $R_1$ is —H,

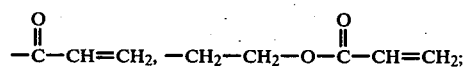

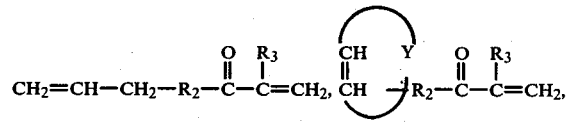

where $R_2$ is

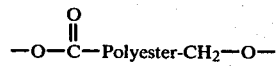

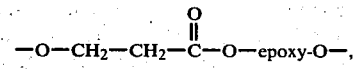

$R_3$ is —H or —$CH_3$,

Y is —CH$_2$—CH—, —CH——CH—, —CH—CH——CH—;
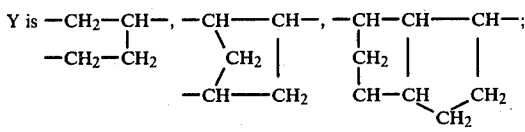

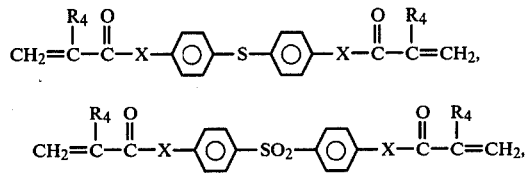

where R$_4$ is H or a lower alkyl group,
X is —O—,

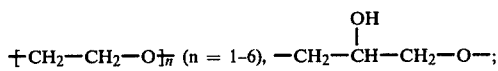

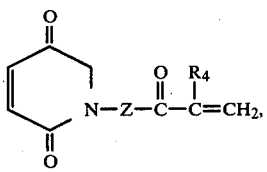

where Z is —CH$_2$—CH$_2$—O—$_n$.

The foregoing list is exemplary as a variety of conventional hydroxy and nonaromatically unsaturated compounds will form suitable complexes with the Cu$^{+1}$ activator according to the precepts of the present invention. Advantages for utilizing the Cu$^{+1}$ complexes for providing the Cu$^{+1}$ activators include the improvement in properties (eg. tensile strength) which the activator provides, the improved availability of the activator from the complex, and like advantages. The proportion of Cu$^{+1}$ activator used in the curable composition is a catalytic proportion adequate to activate the peroxide initiator for achieving cure and generally such proportion is between about 0.1% and 5% by weight of the curable composition.

During the course of research on complexing of Cu$^{+1}$ with various unsaturated resins, a new curable resin was discovered which possesses improved adhesion, solvent resistance, and boiling water resistance. This new resin has the following structure:

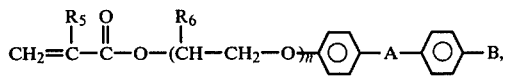

Where,
R$_5$ and R$_6$ are —H or —CH$_3$,
n is an integer of 1-6,

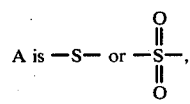

B is an organic group containing no curable unsaturation. Preferably, B is

—O—R$_7$, where,
R$_7$ is an epoxy group, a urethane group, or any organic group containing no curable unsaturation.

The new sulfide/sulfone resins can be complexed with the Cu$^{+1}$ activator, if desired.

Such resins can be synthesized from the following starting materials:

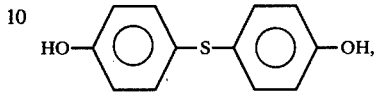

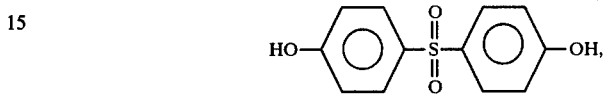

by their reaction with epichlorhydrin or the like, according to the reaction procedure found in Sorenson and Campbell, *Preparative Methods of Polymer Chemistry*, pages 464–465, Interscience Publishers, New York, N.Y. (1968), the disclosure of which is expressly incorporated herein by reference. The resulting molecules then are reacted with an acrylic acid or similar compound containing curable unsaturation for forming an unsymmetrical reactive resin. The residual epoxide group can be left, or reacted further with isocyanate, an alcohol, glycol, alkylene oxide, carboxylic acid, or the like, wherein no curable unsaturation is contained in such reactant. The unreactive tail or chain is important for achieving improved adhesion, solvent resistance, and boiling water resistance compared to an equivalent resin containing two reactive groups, eg. Japanese Pat. No. 56-34204.

The second method for activating the peroxide cure of peroxy-curable ethylenically unsaturated compound utilizes a dual-cure scheme wherein a furfuryl alcohol resin is formed in the presence of a strong acid catalyst. The heat generated in the furan polymer formation is sufficient for activating the peroxide initiator and, thereby, curing the curable ethylenically unsaturated compound. The resulting cured network consists of a combination of acrylic or vinyl, for example, polymer and a cured furfuryl alcohol polymer. The proportion of furfuryl alcohol resin formed can be adjusted for providing specific performance requirements unique to this embodiment of the present invention. The increased chemical resistance imparted by the furfuryl alcohol resin can be important on occasion. General properties of furfuryl alcohol resins and furfuryl alcohol-formaldehyde resins can be found in *Encyclopedia of Polymer Science and Technology*, Vol. 7, pp 431–445, Interscience Publishers, Division of John Wiley & Sons, New York, N.Y. (1967), the disclosure of which is expressly incorporated herein by reference.

The acid catalyst used in initiating the furfuryl alcohol resin polymerization (condensation) is a strong acid, preferably an acid having a pK$_a$ less than about 3, preferably less than about 2, and most preferably about 1.5 or less. The acid should be reasonably soluble in the components of the curable composition to facilitate distribution throughout the polymerizable mixture. While it is not essential, it is preferable that the acid be an organic acid. While the extremely low pK$_a$ acids perform exceptionally well, it is not essential to employ extremely strong acids and frequently it is desirable to avoid using such compounds in view of the hazards and corrosive problems created thereby. Mixtures of acids may be used advantageously. Typical examples which fall within the broad and preferred ranges discussed above are sulfonic acids such as, for example, toluene sulfonic acid, nitrotoluene sulfonic acid, and propane sulfonic acid; dichloro- and trichloroacetic acids, phosphonic acids such as, for example, benzene phosphonic acid. Other useful acids include maleic acid, malonic acid, and acetylene acids such as, for example, acetylene carboxylic and acetylene dicarboxylic acids. The proportion of acid catalyst contained in the curable mixture is an effective proportion for catalyzing the furfuryl alcohol resin formation and typically this ranges from between about 0.01% and about 5% by weight of the furfuryl alcohol resin portion of the curable mixture. Of course the acid catalyst is separated from the furfuryl alcohol resin ingredients prior to polymerization, so that conventional two-pack technology is practiced.

It should be noted that an additional method for activating the furfuryl alcohol resin polymerization reaction involves the generation of a ferrocinium ion. A ferrocinium ion can be generated by the reaction of ferrocine and a peroxide, the reaction of ferrocine and trichloromethylsulfonyl chloride, and a variety of additional known methods. Heretofore, it was reported that ferrocinium ions were useful in promoting free radical cure. McGinniss and Stevenson, *Polymer Preprints*, Vol. 15, pp 302–305 (1974). The use of ferrocinium ions in promoting acid catalyst-curable reactions was a discovery made during the course of developing the present invention. Accordingly, this aspect of the present invention, then, can provide a curable mixture of furfuryl alcohol resin-forming ingredients, acid catalyst, peroxide initiator, acrylic or other ethylenically unsaturated curable compounds, and ferrocene. A truly unique curable mixture results therefrom.

Another unexpected discovery made during the course of developing the present invention and relating to the use of ferrocene involves the discovery of a new complex catalyst which cures epoxides and other compounds wherein a ring-opening reaction is involved. This complex catalyst is a complex of a metallocene, eg. ferrocene, and a diazonium salt of a Lewis acid. Aryl diazonium salts are known in the literature and are easily prepared in high yields by the diazotization of primary aromatic amines with nitrous acid and the Lewis acid of choice. Suitable Lewis acids for this purpose include $BF_3$, $PF_5$, $AsF_5$, $SbF_5$, $FeCl_3$, and $SbCl_5$. Metallocenes include, for example, ferrocene, chromosene, cobaltocene, nickelocene, and manganocene. Ferrocene is the preferred metallocene. The aryl diazonium moeity of the Lewis acid salt can be prepared from virtually any aromatic primary amine and includes, for example, 2,5-diethoxy-4-(para-tolylmercapto)benzene, 2,4-dichlorobenzene, p-nitrobenzene, p-chlorobenzene, p-(N-morpholino)benzene, 2,5-dichlorobenzene, o-nitrobenzene, 2,4,6-trichlorobenzene, 2,4,6-tribromobenzene, 4-dimethylaminonapthalene, and like diazonium compounds. The simple mixing of the aryl diazonium salt of a Lewis acid with the metallocene is sufficient to initiate the ring opening reaction of an epoxide monomer, oligomer, or polymer. Besides a wide variety of epoxides, other heterocyclic ring-opening reactions which can be catalyzed with the novel metallocene-aryl diazonium salt of a Lewis acid catalyst include cyclic ethers, eg.

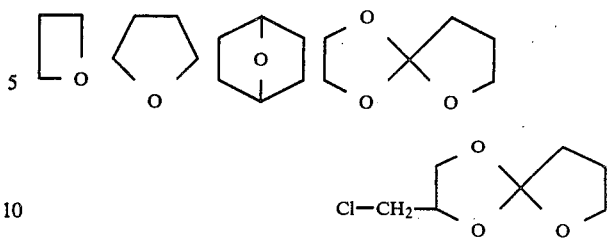

cyclic formals and acetals, eg.

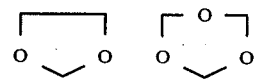

lactones, eg.

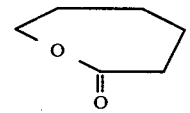

sulfur-containing ring monomers, eg.

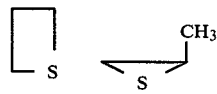

organosilicone monomers, eg.

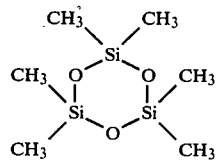

The foregoing ring-compounds are subject to cationic polymerization in the presence of the metallocene aryl diazonium salt of a Lewis acid catalyst as described herein.

The compounds curable by a peroxide initiator often have been referred to as acrylic compounds for convenience and not by way of limitation. Broadly, any ethylenically unsaturated monomer, oligomer, or polymer which can be cured or polymerized in the presence of a peroxide initiator is a suitable compound for use with the novel activator systems of the present invention. In adhesives technology, acrylic or acrylate compounds find wide acceptance in the industry. Another suitable class of ethylenically unsaturated compounds are vinyl compounds while a third broad class are compounds containing backbone ethylenic unsaturation as typified by ethylenically unsaturated polyester polymers. Referring with more particularity to reactive acrylic or acrylate monomers, oligomers, or polymers, a variety of mono- and polyacrylate monomers find use in accordance with the present invention. Monoacrylates include allyl acrylate, amyl acrylate, lauryl acrylate, isopropyl acrylate, and the like; monomethacrylates include, for example, benzyl methacrylate, stearyl methacrylate, decyl methacrylate, cyclohexyl methacrylate, and the like and mixtures thereof; di- and polymethacrylates include, for example, 1,4-butanediol dimethacrylate, diethylene glycol dimethacrylate, propylene glycol dimethacrylate, and the like and mixtures thereof; and di- and polyacrylates include, for example, 1,3-butanediol diacrylate, diethylene glycol diacrylate, ethylene glycol diacrylate, polyethylene glycol diacrylate, tetraethylene glycol diacrylate, and mixtures thereof. The foregoing monomers are merely representative and not limitative of the list of acrylate and methacrylate monomers suitable for use in the present invention as those skilled in the art will appreciate. Other suitable reactive compounds for use in the present invention include acrylated epoxy resins, acrylated silicone resins, acrylated polysulfide/polysulfone resins, acrylated polyurethane resins, acrylated melamine resins, acrylated urea-formaldehyde resins, and the like and mixtures thereof. Such acrylate-functional polymers are well known in the art and little more about them need be said here.

As noted above, the trend to structural adhesive formulations has been facilitated by the development of a new generation of adhesives, so-called second generation acrylic adhesives. Such second generation adhesives are toughened plastics which have been toughened by a variety of mechanisms. Rubbery particles is an example of a method for increasing the toughness of a structural adhesive. Further information on the new generation of acrylic adhesives which can be activated according to the precepts of the present invention can be found in the following selected references: Bennet and Gould, *Assembly Engineering*, Dec. 1978; Lee, *Engineering*, p. 1, Nov. 1977; Lyn, Society of Automotive Eng., Inc., ISSN01487191/79/0228-151 *ADHESIVES AGE*, p. 34, Oct. 1979, and p. 25, Dec. 1979; Wilkinson, *ADHESIVES AGE*, p. 20, July 1978; Cooker et al., *ADHESIVES AGE*, p. 29, Aug. 1977; and U.S. Pat. No. 3,890,407, the disclosures of which are expressly incorporated herein by reference. It will be appreciated that a variety of conventional as well as new acrylic adhesive formulations may be cured in accordance with the precepts of the present invention.

Vinyl monomers, oligomers, and polymers are another important class of ethylenically unsaturated compounds which can be cured with a peroxide initiator. Suitable such vinyl compounds include, for example, vinyl esters of aliphatic and aromatic carboxylic acids, polybutadiene-based compounds, and like vinyl compounds.

A third important class of ethylenically unsaturated compounds are ethylenically unsaturated polyester resins generally containing fumerate or maleate unsaturation and prepared from aromatic or aliphatic dibasic acids or dianhydrides and difunctional alcohols as more particularly pointed out in "Preparative Methods of Polymer Chemistry", W. R. Sorenson and T. W. Campbell, pp 445-452, Interscience Publishers, Division of John Wiley & Son, New York, N.Y., (1968), the disclosure of which is expressly incorporated herein by reference. The ethylenic unsaturation additionally may be contained in a monomer chain or in a side chain pendantly attached to the polymer. In making an ethylenically unsaturated polyester, for example, the hydroxyl component can be a polyol or monomeric alcohol provided from a polyester, polyether, polyurethane, polysulfide, polyamide, and the like. The ethylenic unsaturation can be provided by the monomeric alcohol or polyol itself or can be reacted onto a polyol or monomeric alcohol subsequently by conventional reaction schemes. Examples of such schemes include reacting the monomeric alcohol or polyol with, for example, acrylic acids, acrylyl halides, acrylic-terminated ethers, acrylic or methacrylic anhydrides, isocyanate-terminated acrylates, epoxy acrylates, and the like. Further reaction schemes for formulating such polymers include reacting hydroxy-acrylate monomer, hydroxy methacrylate monomer, or an allyl ether alcohol with a cyclic anhydride such as, for example, the anhydrides: maleic, phthalic, succinic, norborine, gluteric, and the like. The product unsaturated polyester additionally then can be reacted with a suitable oxirane compound, such as, for example, ethylene oxide, propylene oxide, glycidyl acrylate, allyl glycidyl ether, alpha-olefin epoxide, butyl glycidyl ether, and the like. Suitable allyl alcohols include, for example, trimethylol propane monoallyl ether, trimethylol propane diallyl ether, allylhydroxy propyl ether, and the like. Additionally, conventional reaction schemes include reacting alpha-aliphatic or aromatic substituted acrylic acids with an oxirane compound, and reacting the hydroxy acrylate or hydroxy methacrylate with a di-mercaptan compound. Any of the foregoing reaction schemes as well as other conventional reaction schemes can be used as is necessary, desirable, or convenient in conventional fashion. As can be seen from the discussions above, ethylenic unsaturation functionality can be attached to a variety of polymers including polyesters, polyurethanes, silicones, epoxides, polyethers, polysulfides, polysulfones, polyamides, and the like.

In addition to the curable portion of the mixture, non-reactive thermoplastic polymeric species may be included for a variety of special effects. In the adhesive art, such non-reactive thermoplastic polymers include rubbers such as chlorinated rubbers and chlorinated polyethylenes, thermoplastic acrylic polymers, polyester polymers, polyurethanes, silicone polymers, epoxide resins, polyether resins, polysulfide resins, polysulfone resins, polyamide resins, and the like. Additionally, the curable mixture may contain organic cosolvent, though often such cosolvent is unnecessary especially in adhesive applications. A variety of conventional inert fillers also may be contained in the curable mixture as can conventional opacifying and tinctorial pigments. For preferred structral adhesive applications, though, fillers and pigments generally are unnecessary.

A variety of conventional peroxide initiators can be activated according to the precepts of the present invention. Representative of such peroxides include, for example, tert-butyl peroxide, hydrogen peroxide, benzoyl peroxide, cumene hydroperoxide, tetraline hydroperoxide, diisopropyl benzene hydroperoxide, acetyl peroxide, urea peroxide, methyl ethyl ketone peroxide, diisopropyl ether peroxide, and the like, and mixtures thereof. Organic hydroperoxides and peresters may be used, though simple peroxides are preferred. Preferably, the peroxide initiator comprises from about 0.1 to about 5% by weight of the composition.

The curable mixture of the present invention is provided in two or more packages as the presence of the activator with the peroxide curing agent will provide a rapid set or cure of the curable mixture. So long as the peroxide initiator and the activator are contained in separate packages, the various resins or curable portion of the mixture may be contained in either package as is necessary, desirable, or convenient in conventional fashion. The two packages are mixed just prior to application and, depending upon the formulation, working time can be as short as a few seconds on up to several minutes. Conventional structural adhesive application techniques then are employed.

The following examples show how the present invention can be practiced but should not be construed as limiting. In this application, all percentages and proportions are by weight, all units are in the metric system, and all citations are expressly incorporated herein by reference.

IN THE EXAMPLES

EXAMPLE 1

A $Cu^{+1}$ catalyst system was prepared by adding 2.5 g of cuprous chloride to 2 g of water followed by the further addition of 2 g of ascorbic acid. The green colored impure aqueous cuprous chloride solution turned white indicating that it was ready for use.

Several acrylic resins were formulated, admixed with 2% by weight of the $Cu^{+1}$ catalyst system described above, and 3%–5% by weight of cumene hydroperoxide, and the set times thereof recorded. The set time is the time required for the liquid mixture to gel to a solid intractable mass. The following acrylic resins were evaluated with the following results.

TABLE 1

| Run No. | Acrylic Resin | Set Time (min.) |
|---|---|---|
| 1 | Trimethylolpropane triacrylate | 1 |
| 2 | reaction product of acrylic acid (2 moles) and the diglycidyl ether of bis-phenol A (1 mole) (Epoxy-Acrylate) | 1 |
| 3 | PURELAST 166 urethane acrylate (Polymer Systems Corporation) | 1 |
| 4 | equal weight blend of acrylated polyester (1 mole triethylene glycol, 1 mole ethylene glycol, 1 mole 1,3-butylene glycol, 1 mole isophthalic acid, 1 mole adipic acid-terminated with acrylic acid) and hydroxyethylacrylate (see Paint and Varnish Production, Vol. 64, No. 8, 32–36, August 1974) | 12 |
| 5 | same as Run No. 4 plus 10% of a silicone modified thermoplastic polyester as described in Paint and Varnish Production, pages 35–43 (January 1972) | 30 |

When Run No. 3 was repeated using only 2.5% ascorbic acid and 2.5% cumene hydroperoxide (control), the urethane acrylate resin did not set after 24 hours. The efficacy of using the $Cu^{+1}$ catalyst system, thus, is demonstrated.

EXAMPLE 2

In this example, the $Cu^{+1}$ catalyst was complexed with a monomer or polymer which acted as a substrate or carrier for the catalyst. The $Cu^{+1}$ complex (0.05–5% by weight) was added to various of the acrylic resins described in Example 1 and the set times of the resulting mixtures recorded. The $Cu^{+1}$ complex was synthesized from 30 g of the complexing monomer or polymer and 3 g of $Cu^{+1}$ powder. The following results were obtained.

TABLE 2

| Run No. | Complexing Monomer or Polymer | Acrylic Resin* | Set Time (min.) |
|---|---|---|---|
| 1 | Methanol | Urethane acrylate (PURELAST 166) | 1 |
| 2 | Propylene glycol | Urethane acrylate (PURELAST 166) | 1 |
| 3 | Hydroxyethyl methacrylate | Epoxy-Acrylate | 2 |
| 4 | Allyl alcohol | Acrylated Polyester | 10 |
| 5 | Allyl acetate | Acrylated Polyester | 10 |
| 6 | Polybutadiene (liquid, Nisseki B-1500 polybutadiene) | Urethane acrylate (PURELAST 166) | 10 |
| 7 | Allyl methacrylate | Urethane acrylate (PURELAST 166) | 10 |
| 8 | Acrylic acid adduct of dicyclopentadiene acrylate | Urethane acrylate (PURELAST 166) | 10 |
| 9 | Modified polybutadiene resin (HYCAR reactive liquid polymer VTBN 1300 × 22, B. F. Goodrich) | Epoxy-Acrylate | 10 |

*Refer to Table 1 for complete details.

Again, the above-tabulated results demonstrate that the $Cu^{+1}$ can be complexed and such complex function as an effective activator for the peroxide initiator. Such complex results in greater catalyst ($Cu^{+1}$) efficiency and provides a homogenous solution or dispersion of the activator complex in the curable mixture.

EXAMPLE 3

In order to demonstrate the dramatic and unexpected improvement in acrylic formulations cured with the $Cu^{+1}$ catalyst system, three prior art catalyst systems were compared to the inventive $Cu^{+1}$ catalyst system. The acrylic formulation is described in U.S. Pat. No. 4,230,834 and consisted of the following acrylic monomers: methyl methacrylate (1681 parts), methacrylic acid (204 parts), epoxy acrylate of Example 1 (100 parts), 1,3-butylene dimethacrylate (136 parts); a thermoplastic additive being chlorosulfonated polyethylene (1224 parts); and cumene hydroperoxide (34 parts). The catalyst systems evaluated and the results obtained are displayed in the following table.

TABLE 3

| Run No. | Catalyst System[a] | Set Time (min.) | Tensile[b] Strength (kg/cm$^2$) |
|---|---|---|---|
| 1 | 1% ferrocene 1% toluene sulfonic acid 2% cumene hydroperoxide | 4 | 35.15 |
| 2 | 2% N,N—dimethyl aniline 2% cumene hydroperoxide | 60 | 14.06 |
| 3 | 1% butyraldehyde-butyl amine product 0.025% copper (+2) napthanate | 4 | 49.21 |
| 4 | 1% $Cu^{+1}$ 1% ascorbic acid | 4 | 98.42 |

[a]Run 1: U.S. Pat. No. 3,855,040
Run 3: U.S. Pat. No. 4,230,834
[b]ASTM test D1002

The above-tabulated results demonstrate the unexpectedly excellent tensile strength which the $Cu^{+1}$ catalyst system provides in curing acrylic formulations.

EXAMPLE 4

In order to demonstrate the furfuryl alcohol/acid catalyst activator or system, comparative curable formulations with and without furfuryl alcohol were prepared. The results obtained appear below:

TABLE 4

| Run No. | Acrylate[1] Resin | Cumene Hydro-peroxide (wt %) | Organic[2] Sulfonic Acid (wt %) | Furfuryl[3] Alcohol (wt %) | Set Time (min) |
|---|---|---|---|---|---|
| 1 | PES 166 | 5.0 | 5.0 | — | No cure |
| 2 | PES 166 | 5.0 | 5.0 | 5.0 | 30 |
| 3 | PES 166 | 10.0 | 10.0 | 10.0 | 30 |

[1] PES 166 is PURELAST 166 urethane acrylate of Example 1. All percentages are by weight of the PES 166 resin.
[2] Chem-Rez C-2009 organic sulfonic acid, Ashland Chemical Company, Columbus, Ohio.
[3] Chem-Rez 200 furfuryl alcohol, Ashland Chemical Company.

The above-tabulated results demonstrate that the furfuryl alcohol cure generates adequate heat at room temperature to activate the peroxide initiator for cure of the acrylic resin. Note that only a small proportion of the furfuryl alcohol was required in order to activate such cure.

EXAMPLE 5

This example demonstrates the new catalyst system for heterocyclic ring compounds. Two packages were prepared. The first package contained para-nitrobenzene-diazonium fluoroborate (5% by weight of epoxy resin plus 2% water). The second package contained 5% ferrocene in the diglycidyl ether of bis-phenol A (EPON 828 resin, Shell Chemical Company). The two packages when mixed resulted in a cured polymeric network in 30 minutes at room temperature.

EXAMPLE 6

Three different modified epoxy resin adhesion promoters were prepared in accordance with the procedure found in Sorenson and Campbell, *Preparative Methods of Polymer Chemistry*, supra. Two moles of DER 333 epoxy resin (diglycidyl ether of bisphenol A, Dow Chemical Company) were reacted with one mole of bis-phenol A in the presence of 0.1–1% of benzyldimethyl amine catalyst. Two variations of the modified epoxy resin adhesion promoter then were made by the further reaction with one mole of acrylic acid and two moles of acrylic acid. The three modified epoxy resin adhesion promoters can be represented as follows:

EXAMPLE 7

The procedure of Example 6 was repeated, exept that the bisphenol A epoxy resin was replaced with 4,4'-dihydroxy-diphenylsulfone.

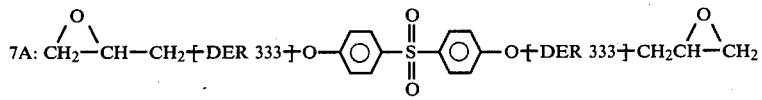

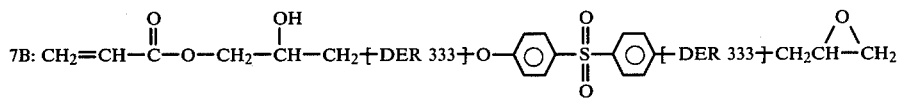

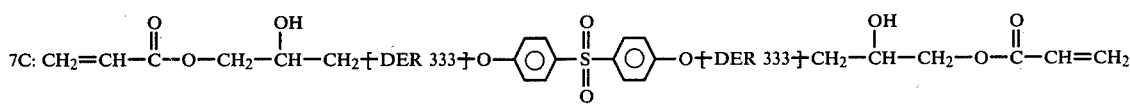

EXAMPLE 8

The procedure of Example 6 was repeated, except that the bisphenol A was replaced with 4-4'-dihydroxydiphenylsulfide.

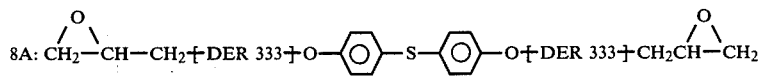

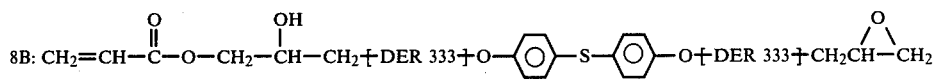

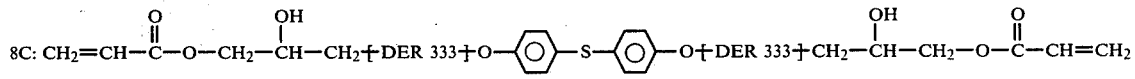

EXAMPLE 9

A two-package acrylic adhesive formulation was prepared from 20% by weight of each of the adhesion promoters of Examples 6-8, 50% by weight methyl methacrylate, and 30% by weight of PURELAST 166 urethane acrylate of Example 1. The catalyst system comprised $Cu^{+1}$ (1% by weight) and cumene hydroperoxide (2% by weight). Each of the nine adhesive compositions were cured at room temperature for 24 hours between two 2.54 cm×15.24 cm (1"×16") steel coupons.

Thereafter, sets of the bonded coupons were subjected to stressing by immersion in boiling water for one hour and by immersion in chloroform solvent for 5 hours. The lap shear adhesively bonded coupons then were subjected to evaluation by attempting to pull them apart by hand. The following results were obtained.

TABLE 5

| Promoter No. | Boiling Water* Immersion | Chloroform* Immersion |
|---|---|---|
| 6A | No | No |
| 6B | No | Some |
| 6C | No | No |
| 7A | Yes | No |
| 7B | Yes | Yes |
| 7C | No | No |
| 8A | Yes | No |
| 8B | Yes | Yes |
| 8C | No | No |

*No: easily pulled apart by hand
Some: harder to pull apart, but bond does fail
Yes: very difficult to pull apart or cannot be pulled apart by hand.

The above-tabulated results show that only the mono-functional sulfone/sulfide resins, Promoters 7B and 8B, imparted sufficient adhesion so that both the boiling water and the solvent immersion tests could be passed.

EXAMPLE 10

A series of two-package adhesive formulations catalyzed with $Cu^{+1}$ was prepared, cured at room temperature between two coupons and their shear strengths recorded. The formulations and results obtained appear below.

TABLE 6

| Ingredient | 7-22 | 7-23 | 7-24 |
|---|---|---|---|
| Part A | | | |
| Epoxy Acrylate[1] | 9 | 9 | 5 |
| Methacrylic Acid | 1 | 1 | 1 |
| PES 166[2] | — | — | 3 |
| Acrylic Oligomer[3] | — | — | 2 |
| Bis(methacryloxy ethyl) Phosphate[4] | 0.3 | 0.3 | 0.3 |
| Cumene hydroperoxide | 1 | 1 | 0.7 |
| Part B | | | |
| Acrylic Oligomer[3] | 00 | 00 | 2 |
| Epoxy Acrylate[1] | 9 | 9 | 5 |
| $Cu^{+1}$ Complex A[5] | 1 | — | 1 |
| $Cu^{+1}$ Complex B[6] | — | 1 | — |
| PES 166[2] | — | — | 3 |
| Shear Strength (kg/cm²) | 105.6 | 81.6 | 130.0 |

[1] Grade 40 BH epoxy acrylate, Dai Nippon Ink Chemicals Co., Tokyo, Japan
[2] PURELAST 166 urethane acrylate of Example 1
[3] ARONICS M7200 acrylic oligomer, Toa Gosei Co., Tokyo, Japan
[4] Grade JPA-514 bis(methacryloxy ethyl) phosphate, Johhoku Chemical Co., Tokyo Japan
[5] $CuCl_2$ - 25 parts
Allyl alcohol - 2.5 parts
Ascorbic acid - 2.5 parts
[6] Grade JPA-514 bis(methacryloxy ethyl) phosphate - 25 parts $CuCl_2.2H_2O$ - 2.5 parts The above-tabulated results demonstrate the excellent shear strength properties of acrylic adhesives cured with the novel $Cu^{+1}$ catalyst complex of the present invention.

EXAMPLE 11

Another series of two-package $Cu^{+1}$ catalyzed adhesive formulations were prepared and their shear strength evaluated with the following results.

TABLE 7

| Ingredient | 8-13 | 8-14 | 8-15 | 8-16 | 8-17 | 8-18 | 8-19 |
|---|---|---|---|---|---|---|---|
| Part A | | | | | | | |
| Epoxy Acrylate 40BH | 9 | 9 | 9 | 9 | 9 | 9 | 9 |
| Methacrylic Acid | 1 | 1 | 1 | 1 | 1 | 1 | 1 |
| Bis(methacryloxy ethyl)[1] phosphate | 0.3 | 0.3 | 0.3 | 0.3 | 0.3 | 0.3 | 0.3 |
| Cumene Hydroperoxide | 0.7 | 0.7 | 0.7 | 0.7 | 0.7 | 0.7 | 0.7 |
| Part B | | | | | | | |
| Epoxy Acrylate 40BH[1] | 8.7 | 8.7 | 8.7 | 8.7 | 8.7 | 8.7 | 8.7 |
| Methacrylic Acid | 1 | 1 | 1 | 1 | 1 | 1 | 1 |
| Bis(methacryloxy ethyl)[1] phosphate | 0.3 | 0.3 | 0.3 | 0.3 | 0.3 | 0.3 | 0.3 |
| $Cu^{+1}$ Complex DEG[2] | 0.5 | 0.3 | 0.2 | 0.1 | 0.05 | — | — |
| $Cu^{+1}$ Complex 1.2P[3] | — | — | — | — | — | 0.3 | — |
| $Cu^{+1}$ Complex 1.3P[4] | — | — | — | — | — | — | 0.3 |
| Set Time (min) | 3-4 | 2 | 3 | 5-6 | 5-6 | 2 | 1 |
| Shear Strength (kg/cm²)[5] | 49.8 | 73.0 | 72.2 | 74.1 | 90.6 | 73.6 | 47.7 |

[1] See Table 6, Example 10
[2] Diethylene glycol - 30 g
$CuCl_2.2H_2O$ - 3 g
Ascorbic Acid - 3 g
[3] 1,2-propane diol - 30 g
$CuCl_2.2H_2O$ - 3 g
Ascorbic Acid - 3 g
[4] 1,3-propane diol - 30 g
$CuCl_2.2H_2O$ - 3 g
Ascorbic Acid - 3 g
[5] Room temperature cure for 72 hours; average of 3 samples; cohesive failure only for sample no. 8-16, 8-17, and 8-18.

The above-tabulated results again demonstrate the rapid set times and excellent hard strengths that are achieved with the novel $Cu^{+1}$ complex catalyst.

EXAMPLE 12

Several more two-package $Cu^{+1}$ catalyzed adhesive formulations were prepared and evaluated as follows.

TABLE 8

| Ingredient | 8-41 | 8-42 | 8-43 | 8-44 | 8-45 | 8-46 | 8-47 | 8-48 | 8-49 | 8-50 |
|---|---|---|---|---|---|---|---|---|---|---|
| Part A | | | | | | | | | | |
| Epoxy Acrylate 40BH[1] | 6.5 | 6.5 | 6.5 | 6.5 | 6.5 | 6.5 | 6.5 | 6.5 | 6.5 | 6.5 |

TABLE 8-continued

| Ingredient | 8-41 | 8-42 | 8-43 | 8-44 | 8-45 | 8-46 | 8-47 | 8-48 | 8-49 | 8-50 |
|---|---|---|---|---|---|---|---|---|---|---|
| Methacrylic Acid | 1.0 | 1.0 | 1.0 | 1.0 | 1.0 | 1.0 | 1.0 | 1.0 | 1.0 | 1.0 |
| Bis (methacryloxy ethyl)[1] phosphate | 0.3 | 0.3 | 0.3 | 0.3 | 0.3 | 0.3 | 0.3 | 0.3 | 0.3 | 0.3 |
| Cumene Hydroperoxide | 0.7 | 0.7 | 0.7 | 0.7 | 0.7 | 0.7 | 0.7 | 0.7 | 0.7 | 0.7 |
| Hexanediol diacryalate | 1.5 | — | — | — | — | — | — | — | — | — |
| Acrylic oligomer 3GT[2] | — | 1.5 | — | — | — | — | — | — | — | — |
| Triallyl isocyanurate | — | — | 1.5 | — | — | — | — | — | — | — |
| Trimethylolpropane | — | — | — | 1.5 | — | — | — | — | — | — |
| Epoxy (polyoxyethylene)[3] acrylate-4 | — | — | — | — | 1.5 | — | — | — | — | — |
| Epoxy (polyoxyethylene)[4] acrylate-2.6 | — | — | — | — | — | 1.5 | — | — | — | — |
| Hydroxypropyl Methacrylate | — | — | — | — | — | — | 1.5 | — | — | — |
| 2-Hydroxy ethyl methacrylate | — | — | — | — | — | — | — | 1.5 | — | — |
| Triacrylate PE-3A[5] | — | — | — | — | — | — | — | — | 1.5 | — |
| Hemi Caprolactone[6] | — | — | — | — | — | — | — | — | — | 1.5 |
| Part B | | | | | | | | | | |
| Epoxy Acrylate 40BH[1] | 6.5 | 6.5 | 6.5 | 6.5 | 6.5 | 6.5 | 6.5 | 6.5 | 6.5 | 6.5 |
| Methacrylic Acid | 1.0 | 1.0 | 1.0 | 1.0 | 1.0 | 1.0 | 1.0 | 1.0 | 1.0 | 1.0 |
| Bis (methacryloxy ethyl)[1] phosphate | 0.3 | 0.3 | 0.3 | 0.3 | 0.3 | 0.3 | 0.3 | 0.3 | 0.3 | 0.3 |
| Hexanediol diacryalate | 1.5 | — | — | — | — | — | — | — | — | — |
| Acrylic oligomer 3GT[2] | — | 1.5 | — | — | — | — | — | — | — | — |
| Triallyl isocyanurate | — | — | 1.5 | — | — | — | — | — | — | — |
| Trimethylolpropane | — | — | — | 1.5 | — | — | — | — | — | — |
| Epoxy (polyoxyethylene)[3] acrylate-4 | — | — | — | — | 1.5 | — | — | — | — | — |
| Epoxy (polyoxyethylene)[4] acrylate-2.6 | — | — | — | — | — | 1.5 | — | — | — | — |
| Hydroxypropyl Methacrylate | — | — | — | — | — | — | 1.5 | — | — | — |
| 2-Hydroxy ethyl methacrylate | — | — | — | — | — | — | — | 1.5 | — | — |
| Triacrylate PE-3A[5] | — | — | — | — | — | — | — | — | 1.5 | — |
| Hemi Caprolactone[6] | — | — | — | — | — | — | — | — | — | 1.5 |
| Cu+1 Complex 1.2P[7] | 0.1 | 0.1 | 0.1 | 0.1 | 0.1 | 0.1 | 0.1 | 0.1 | 0.1 | 0.1 |
| Set Time (min) | 25 | 15 | 8 | 8 | 10 | 9 | 17 | 13 | 60 | 60 |
| Shear strength (kg/cm2)[8] | 74.4 | 66.9 | 77.3 | 55.4 | 83.2 | 82.1 | 76.2 | 97.0 | 85.3 | 91.2 |

[1]See Table 6, Example 10
[2]Acrylic Oligomer 3GT, Shinnakamura Chemical Co., Wakayama, Japan
[3]Grade BPE-4 epoxy(polyoxyethylene) acrylate, Shinnakamura Chemical Co., Wakayama, Japan
[4]Grade BPE-2.6 epoxy(polyoxyethylene) acrylate, Shinnakamura Chemical Co., Wakayama, Japan
[5]Grade PE-3A triacrylate, Shinnakamura Chemical Co., Wakayama, Japan
[6]PLACCEL FM-1 hemi caprolactone, Diacel Co., Osaka, Japan
[7]See Table 7, Example 11
[8]Room temperature cure for 63 hours; average of 3 samples.

Again, the invention is demonstrated with respect to the Cu+1 complex for use with a two-pack acrylic adhesive.

EXAMPLE 13

Additional two-package Cu+1 catalyzed adhesive formulations were prepared and evaluated as follows.

TABLE 9

| Ingredient | 10-44 | 10-45 | 10-46 | 10-47 | 10-48 | 10-49 | 10-50 | 10-51 | 10-52 |
|---|---|---|---|---|---|---|---|---|---|
| Part A | | | | | | | | | |
| Cumene hydroperoxide | 3 | 3 | 3 | 3 | 3 | 3 | 3 | 3 | 3 |
| Bis (methacryloxy ethyl)[1] phosphate | 3 | 3 | 3 | 3 | 3 | 3 | 3 | 3 | 3 |
| Methacrylic Acid | 9 | 9 | 9 | 9 | 9 | 9 | 9 | 9 | 9 |
| 2-Hydroxy ethyl methacrylate | 10 | 10 | 10 | 10 | 10 | 10 | 10 | 10 | 10 |
| Triallyl isocyanurate | 5 | 5 | 5 | 5 | 5 | 5 | 5 | 5 | 5 |
| Epoxy acrylate oligomer[2] EPN-1000 XC | 55 | 45 | 35 | 20 | 10 | 60 | 50 | — | — |
| Urethane Acrylic Oligomer[3] HO-MPP-U | 10 | 20 | 30 | 45 | 55 | — | — | 60 | 50 |
| Epoxy Acrylate Oligomer[4] VR-90 | 5 | 5 | 5 | 5 | 5 | 10 | 25 | 10 | 20 |
| Bis (methacryloxy ethyl)[1] phosphate | 3 | 3 | 3 | 3 | 3 | 3 | 3 | 3 | 3 |
| Methacrylic Acid | 10 | 10 | 10 | 10 | 10 | 10 | 10 | 10 | 10 |
| 2-Hydroxy ethyl methacrylate | 10 | 10 | 10 | 10 | 10 | 10 | 10 | 10 | 10 |
| Triallyl isocyanurate | 5 | 5 | 5 | 5 | 5 | 5 | 5 | 5 | 5 |
| Epoxy acrylate oligomer[2] EPN-1000 XC | 55 | 45 | 35 | 20 | 10 | 60 | 50 | — | — |
| Urethane Acrylic Oligomer[3] HO-MPP-U | 10 | 20 | 30 | 45 | 55 | — | — | 60 | 50 |

TABLE 9-continued

| Ingredient | 10-44 | 10-45 | 10-46 | 10-47 | 10-48 | 10-49 | 10-50 | 10-51 | 10-52 |
|---|---|---|---|---|---|---|---|---|---|
| Epoxy Acrylate Oligomer[4] VR-90 | 5 | 5 | 5 | 5 | 5 | 10 | 25 | 10 | 20 |
| $Cu^{+1}$ Complex DEG[5] | 2 | 5 | 5 | 5 | 5 | 5 | 5 | 5 | 5 |
| Set Time (min) | 140 | 90 | 70 | 60 | 20 | 120 | 120 | 6 | 3 |
| Shear Strength (kg/cm²)[6] | 90.8 | 113.3 | 158.3 | 158.3 | 131.7 | 143.3 | 111.7 | 76.7 | 96.7 |

[1] See Table 6, Example 10
[2] Grade EPN-1000XC epoxy acrylate oligomer, Showa Kobunshi Co., Tokyo, Japan
[3] Grade HO-MPP-U urethane acrylate oligomer, Hyoeisha Yshi Co., Osaka, Japan
[4] Grade VR-90 epoxy acrylate oligomer, Showa Kobunshi Co., Tokyo, Japan
[5] See Table 7, Example 11
[6] Room temperature cure for 24 hours; average of 2 runs.

The performance of the $Cu^{+1}$ complex is yet again confirmed.

I claim:

1. A catalyst system capable of effecting room temperature cure of a curable mixture comprising at least one ethylenically-unsaturated compound which comprises a $Cu^{+1}$ activator and a peroxide initiator.

2. The catalyst system of claim 1 which additionally comprises a reducing agent.

3. The catalyst system of claim 2 wherein said reducing agent is selected from the group consisting of ascobic acid, sodium sulfite, sodium bisulfite, sodium metabisulfate, and mixtures thereof.

4. The catalyst system of claim 3 wherein said reducing agent is ascorbic acid.

5. The catalyst system of claim 1 wherein said $Cu^{+1}$ activator is a $Cu^{+1}$ olefin complex or a $Cu^{+1}$ hydroxyl complex.

6. The catalyst system of claim 5 wherein said olefin of said complex is a vinyl or acrylic monomer, oligomer, or polymer.

7. The catalyst system of claim 5 wherein said olefin or said hydroxyl compound of said complex is selected from one of the following:

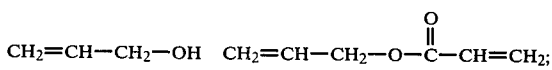

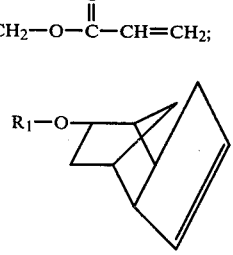

where $R_1$ is —H,

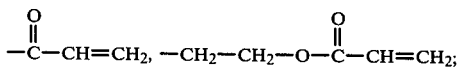

where $R_2$ is

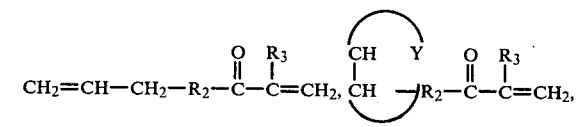

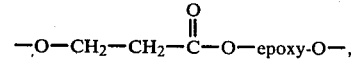

$R_3$ is —H or —$CH_3$,

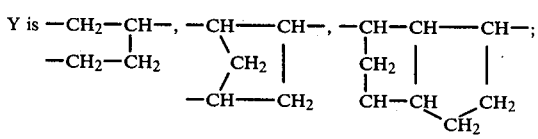

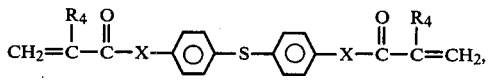

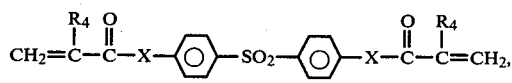

where $R_4$ is H or a lower alkyl group,
X is —O—,

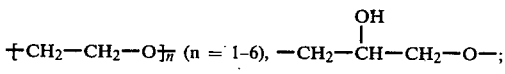

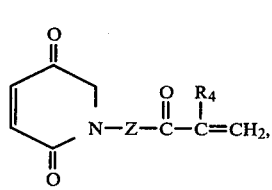

where Z is —$CH_2$—$CH_2$—O—$_n$.

8. The catalyst system of claim 1 wherein said peroxide initiator is selected from the group consisting of tert-butyl peroxide, hydrogen peroxide, benzoyl peroxide, cumene hydroperoxide, tetraline hydroperoxide, diisopropyl benzene hydroperoxide, acetyl peroxide, urea peroxide, methyl ethyl ketone peroxide, diisopropyl ether peroxide, and mixtures thereof.

* * * * *